United States Patent [19]
Yarwood et al.

[11] 4,024,056
[45] May 17, 1977

[54] FILTERING OF MOLTEN METAL

[75] Inventors: John C. Yarwood, Madison, Conn.;
James E. Dore, Ballwin, Mo.; Robert K. Preuss, Middletown, Conn.

[73] Assignee: Swiss Aluminium Ltd., Chippis, Switzerland

[22] Filed: July 21, 1975

[21] Appl. No.: 597,963

[52] U.S. Cl. .................................. 210/69; 210/71
[51] Int. Cl.² ........................................ B01D 23/02
[58] Field of Search ............. 210/69, 71, 232, 238, 210/455, 477, 479, 510; 55/522, 523, 529; 75/63, 64, 68 R

[56] References Cited

UNITED STATES PATENTS

| | | | |
|---|---|---|---|
| 732,659 | 6/1903 | Scott | 210/477 X |
| 1,235,395 | 6/1917 | Storm | 210/477 X |
| 2,682,315 | 6/1954 | Evans | 55/502 X |
| 3,006,473 | 10/1961 | Gamber | 210/69 |
| 3,947,363 | 3/1976 | Pryor et al. | 210/510 |

*Primary Examiner*—John Adee
*Attorney, Agent, or Firm*—Robert H. Bachman

[57] ABSTRACT

The disclosure teaches an improvement in the filtration of molten metal, especially aluminum, using a removable filter plate. The filter plate is provided with a bevelled peripheral surface mating with a like bevelled surface in a filter chamber so that the filter plate can be conveniently inserted in the chamber and removed therefrom.

23 Claims, 8 Drawing Figures

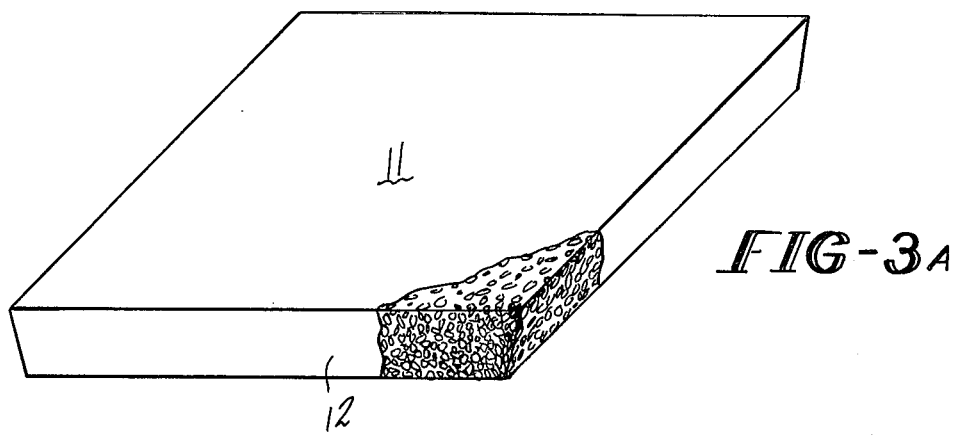
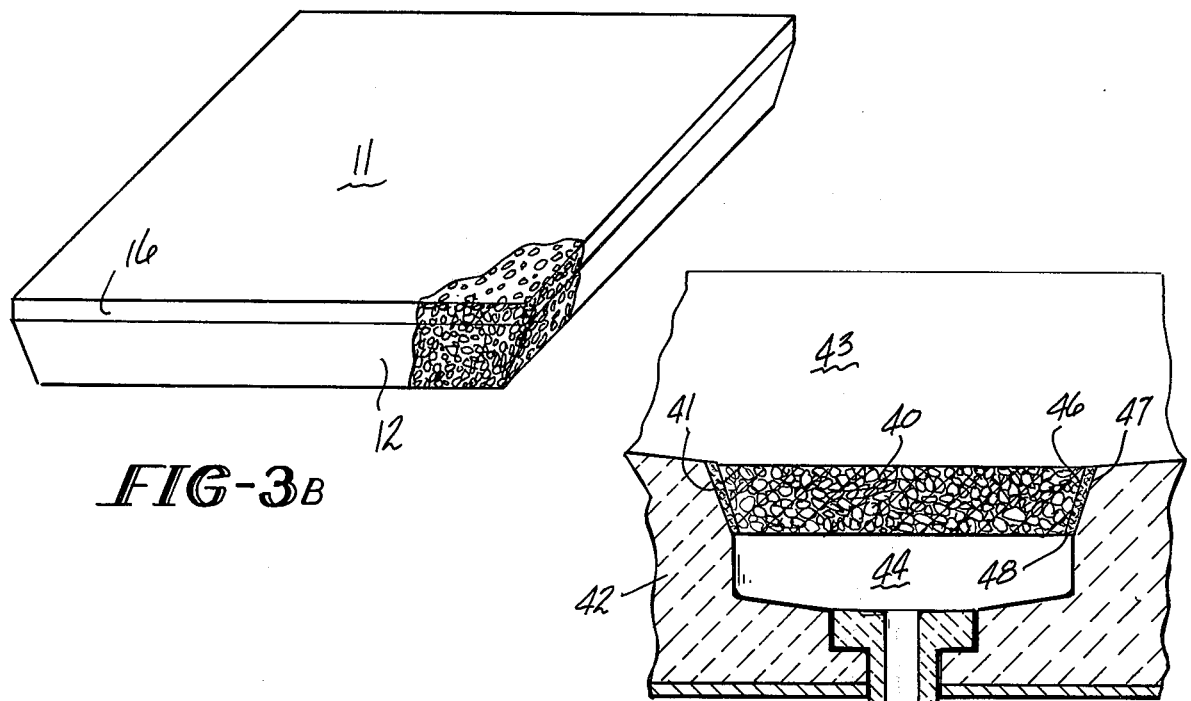
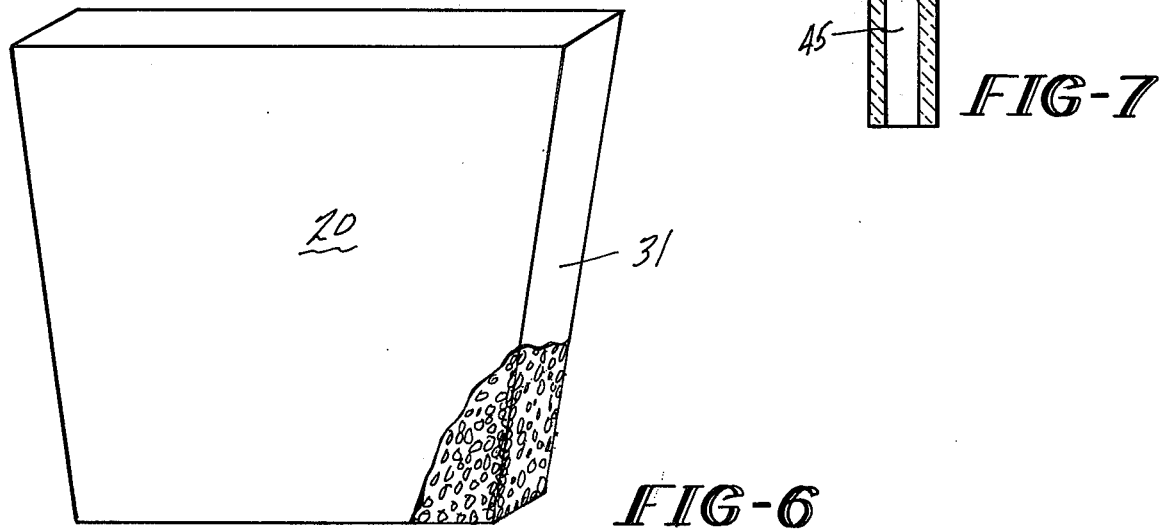

FILTERING OF MOLTEN METAL

BACKGROUND OF THE INVENTION

Molten metal, particularly molten aluminum, in practice generally contains entrained solids which are deleterious to the final cast metal product. These entrained solids appear as inclusions in the final cast product after the molten metal is solidified and cause the final product to be less ductile or to have poor bright finishing and anodizing characteristics. The inclusions may originate from several sources. For example, the inclusions may originate from surface oxide films which become broken up and are entrained in the molten metal. In addition, the inclusions may originate as insoluble impurities, such as carbides, borides and others or eroded furnace and trough refractories.

It is naturally highly desirable to improve the filtration of molten metals in order to remove or minimize entrained solids in the final cast product, particularly with respect to molten aluminum and especially, for example, when the resultant metal is to be used in a decorative product, such as decorative trim or sheet made from the 5000 series of aluminum alloys, as aluminum Alloys 5252 and 5657. Inclusions as aforesaid cause loss of properties in the final solidified alloy and lead to degradation of processing efficiency and loss of properties in the final product. For example, one type of finishing flaw which is particularly significant in decorative trim or sheet made from aluminum Alloy 5252 is a stringer defect known as a linear defect.

Rigorous melt treatment processes, such as gas fluxing, minimize the occurrence of such defects; however, these are not successful in reducing them to a satisfactory level for critical applications. Conventionally, melt filtration is utilized in order to decrease the extent of such defects, and others caused by the presence of inclusions in the melt. The most common form of melt filtration involves the use of open weave glass cloth screens placed in transfer and pouring troughs or in the molten pool of metal in the top of a solidifying ingot. Such filters have been found to be only partially effective since they remove only the larger inclusions. Another type of filter in common use is a bed filter made up, for example, of tabular alumina. Such filters have many disadvantages, perhaps the most serious of which is the great difficulty experienced in controlling and maintaining the pore size necessary for efficient filtration. Another difficulty with such filters is their tendency to produce an initial quantity of metal having poor quality at the start up of each successive casting run. This behavior results in a so-called ingot "butt effect", that is, ingots having butt portions of relatively poor quality which must be scrapped and recycled. Still further, the metal in a bed filter must be maintained molten even when the filter is not in use.

Porous ceramic foam materials are known in the art, for example, having been described in U.S. Pat. Nos. 3,090,094 and 3,097,930. These porous ceramic foam materials are known to be particularly useful in filtering molten metal, as described in U.S. Pat. No. 3,893,917 for "Molten Metal Filter" by Michael J. Pryor and Thomas J. Gray, patented July 8, 1975, and also as described in copending U.S. Patent Application Ser. No. 563,213 for "Ceramic Foam Filter" by John C. Yarwood, James E. Dore and Robert K. Preuss, filed Mar. 28, 1975.

Porous ceramic foam materials are particularly useful for filtering molten metal for a variety of reasons included among which are their excellent filtration efficiency, low cost, ease of use and ability to use same on a disposable, throwaway basis. The fact that these ceramic foam filters are convenient and inexpensive to prepare and may be used on a throwaway basis requires the development of means for easily and conveniently assembling and removing porous, molten metal filters from a filtration unit while providing a highly efficient filtration assembly.

Accordingly, it is a principal object of the present invention to provide an improved method and apparatus for the filtration of molten metal with a removable filter plate.

It is particular object of the present invention to provide an improved removable filter plate for use in the filtration of molten metal.

It is a still further object of the present invention to provide improvements as aforesaid which are convenient and inexpensive to utilize and which result in high filtration efficiency.

Further objects and advantages of the present invention will appear hereinbelow.

SUMMARY OF THE INVENTION

In accordance with the present invention it has been found that the foregoing objects and advantages may be readily obtained.

The present invention provides a highly efficient filtration assembly which utilizes a conveniently removable filter plate. The removable filter plate of the present invention is easily assembled and disassembled in the filtration assembly and enables one to obtain excellent filtration efficiency.

In accordance with the method of the present invention a filter chamber is provided having a metal inlet and a metal outlet and having a bevelled wall surface adapted to be partitioned by a filter plate; a rigid filter plate is provided for filtration of molten metal having an open cell structure characterized by a plurality of interconnected voids, preferably a ceramic foam filter plate with the interconnected voids being surrounded by a web of said ceramic, wherein the filter plate has a bevelled peripheral surface adapted to mate with the bevelled wall surface of the filter chamber; and a resilient sealing means is provided on said bevelled filter plate surface resistant to said molten metal. The filter plate and sealing means are inserted in the filter chamber to engage the bevelled wall surface of the filter chamber and thereafter molten metal is passed through the filter plate for discharge through said outlet, wherein the surface of the filter plate is maintained below the level of the molten metal.

Accordingly, it can be also seen that the present invention provides an improved filter plate for use in the filtration of molten metal having an open cell structure characterized by a plurality of interconnected voids, preferably a ceramic foam filter as aforesaid, said plate having a bevelled peripheral surface adapted to mate with a corresponding bevelled surface in a filter chamber. The present invention also provides an improved filtration apparatus comprising: a filter chamber having a metal inlet and metal outlet and having a bevelled wall surface adapted to be partitioned by a filter plate; a filter plate for filtration of molten metal having an open cell structure characterized by a plurality of interconnected voids, said plate having a bevelled peripheral surface mating with the bevelled wall surface of the filter chamber; and a resilient sealing means between and engaging said mating surfaces resistant to said molten metal, wherein the filter plate partitions the filter chamber so as to be readily insertable therein and removable therefrom.

As indicated hereinabove, the present invention provides considerable advantages in the filtration of molten metal, especially aluminum. Thus, for example, the present invention enables one to filter molten metal with a conveniently removable filter plate which may be easily and quickly inserted in the filtration apparatus and easily and conveniently removed therefrom. In accordance with the preferred embodiment of the present invention when a ceramic foam filter plate is utilized, extremely high filtration efficiencies are obtained and these efficiencies are obtained utilizing a disposable filter plate which can be easily and conveniently inserted and removed from the filtration apparatus.

BRIEF DESCRIPTION OF THE DRAWINGS

FIG. 3A is a perspective view of the filter plate of the present invention as shown in FIGS. 1 and 2;

FIG. 3B is a perspective view of a modified filter plate similar to the filter plate shown in FIG. 3A;

FIG. 6 is a perspective view of the filter plate of the present invention as shown in FIGS. 4 and 5; and FIG. 7 is a sectional view of another embodiment of the present invention wherein the filter plate is disposed above an individual pouring spout.

DETAILED DESCRIPTION

Figure 1:
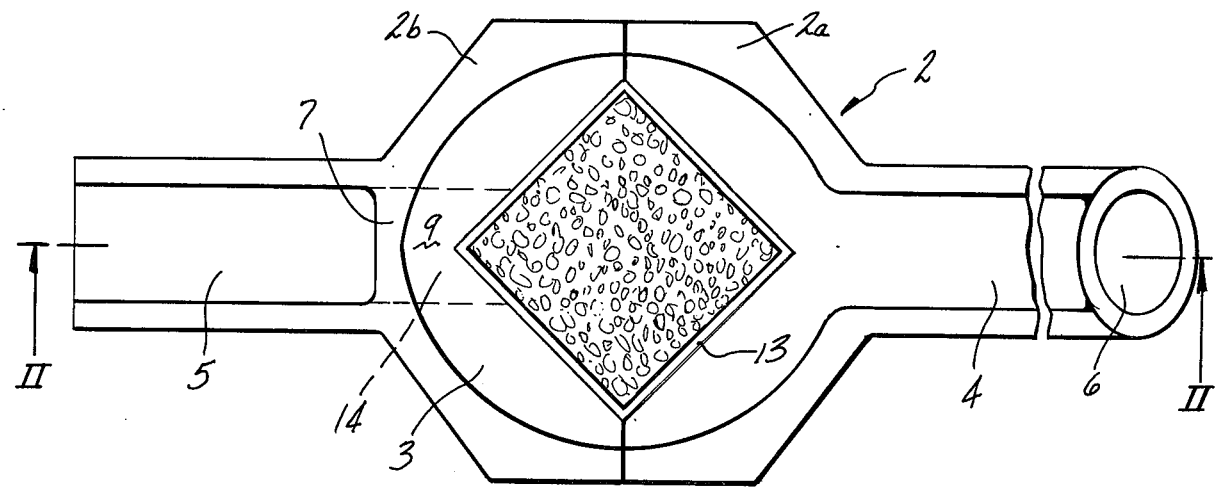
FIG. 1 is a top view of the filter chamber of the present invention including the filter plate in place therein substantially horizontally disposed.
Figure 2:
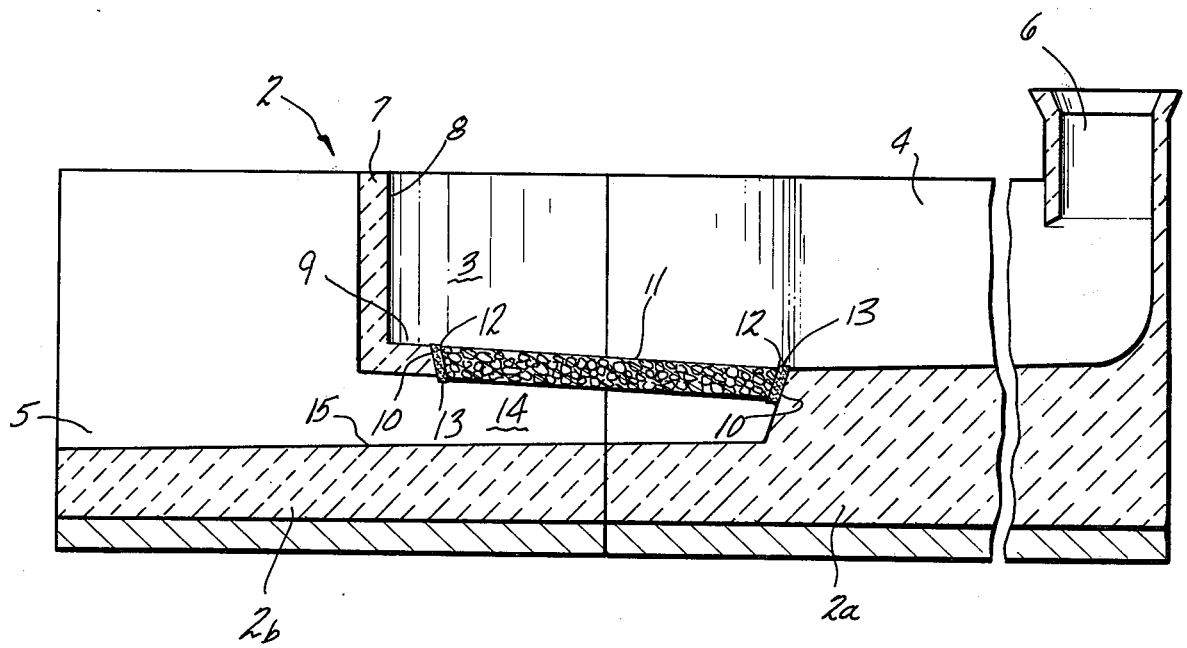
FIG. 2 is a sectional view along the lines II-II of FIG. 1.

A filter chamber is illustrated in FIGS. 1 and 2, as in a molten metal transfer system, pouring pans, pouring troughs, transfer troughs, metal treatment bays, or the like. The filter apparatus 2 may if desired be constructed in two sections 2a and 2b which may be bolted together by any suitable means, such as by flanges at the peripheries thereof, not shown. The particular filter apparatus illustrated in FIGS. 1 and 2 is a transfer trough containing a central filter chamber 3 fed by inlet 4 with the metal passing out of the filter chamber via outlet 5. The molten metal may enter the inlet 4 by any suitable means, such as pouring spout 6. The filter chamber 3 is a bowl shaped chamber, the bottom of which is recessed below the level of the inlet 4 so that the molten metal passing into the filter chamber 3 may travel downwardly through the filter plate of the present invention in place in the filter chamber. Thus, the filter chamber 3 is characterized by a peripheral rim 7 which may completely surround the upper portion of the filter chamber. As shown in FIG. 1, the filter chamber rim 7 surrounds the filter chamber on all sides except adjacent the area of inlet 4. The filter chamber rim 7 is connected to side wall 8 which extends downwardly to filter chamber floor 9 which has a circumferential bevelled portion or aperture 10 (FIG. 2) extending around the periphery thereof to mate with the bevelled wall surface of the filter plate. The filter plate 11 has a corresponding bevelled peripheral surface 12 adapted to mate with the bevelled wall surface 10 of the filter chamber. The bevelled peripheral surface of filter 12 is provided with a resilient sealing means 13 thereon resistant to the molten metal, and the filter plate 11 and sealing means 13 are inserted in the filter chamber 3 so that the filter plate-sealing means assembly engages the bevelled wall surface of the filter chamber.

Thus, as shown in FIGS. 1 and 2, the filter 11 is substantially horizontally disposed in a trough. The filter as shown has a square configuration; however, any convenient shape may be readily employed for the filter, such as round, hexagonal or the like. The filter plate 11 is positioned in a recessed section of a filter chamber or filter bowl 3, such as in the floor portion 9 thereof. Molten metal is fed to the filter 11 via inlet 4 into the filter chamber 3. The molten metal passes downwardly through filter 11 into the recess 14 beneath the filter plate 11. The filter 11 is sealed in place by means of resilient seal 13 so that the filter plate may be readily inserted by pressure vertically downwards and easily removed by pressure vertically upwards. Alternatively, as indicated above, the filter chamber may be split and moved laterally for positioning the gasketed or sealed filter plate in the filter chamber, with the filter plate held therein with a vise type action. Preferably, the bevelled peripheral surface of the filter chamber 10 is bevelled at an angle of from 2 to 20° and the filter plate is preferably provided with a bevelled surface 12 corresponding thereto at an angle of from 2 to 20°. The filter plate 11 is preferably substantially horizontally disposed at an angle of from 1° to 5° upwardly sloped towards the metal outlet 5 in order to prevent entrapment of air against the underside of the filter. In addition, the floor 15 of recess 14 beneath filter plate 11 is preferably sloped downwardly at an angle of from 1° to 5° sloped towards outlet 5 in order to facilitate drainage of metal during operation and at the completion of the pouring or transfer operation.

Alternatively, if desired, the filter chamber may be split horizontally, as along a horizontally plane beneath floor 9, or on an angle beneath floor 9, particularly to enable easy cleaning of recess 14. It may be desirable to reverse the direction of the taper of bevelled portion 10, effecting a positive seal by means of the wall portion in recess 14.

Filters up to several inches thick and several square feet in area can be readily and conveniently located in pouring or transfer troughs or the like as described above. It is preferred, however, to restrict the thickness of the filter plate to from ½" to 4". Conventional materials of construction may be utilized in the preparation of the transfer trough including the filter chamber 3 and inlet and outlets 4 and 5, such as, for example, making the filter chamber and inlet and outlets of castable refractory or ceramic tile.

The velocity of the molten metal below the filter is determined by the flow rate of the metal and the cross section of the flow channel under the filter. This velocity should be high enough to help sweep air bubbles away. Preferably the filter should be level with or slightly below the bottom surface of floor portion 9 to avoid catching air bubbles thereon. Preferably also the top surface of the filter should be level or slightly recessed to avoid the formation of a metal dam. The depth of the chamber above the filter should be sufficient to ensure priming of the filter without overflow, as, for example, preferably a depth of at least six inches and generally higher than ten inches.

The filter plate of the present invention should have an open cell structure characterized by a plurality of interconnected voids so that the molten metal passes therethrough for use in removing or minimizing entrained solids from the final cast product, as, for example, a solid filter plate made from sintered ceramic aggregate or a porous carbon plate. In the preferred embodiment, a ceramic foam filter is utilized as described in the aforesaid copending application SN 563,213. In accordance with the teaching of said copending application, the ceramic foam filter has an open cell structure characterized by a plurality of interconnected voids surrounded by a web of said ceramic material. The ceramic filter has an air permeability in the range of from 400 to 8,000 $\times 10^{-7}$ cm$^2$, preferably from 400 to 2500 $\times 10^{-7}$ cm$^2$, a porosity or void fraction of 0.80 to 0.95 and from 5 to 45 pores per linear inch, preferably from 20 to 45 pores per linear inch. The molten metal flow rate through the filter should be from 5 to 50 cubic inches per square inch of filter area per minute. The ceramic foam filter described in said Ser. No. 563,213 is particularly suitable in the present invention since it is low cost and may be readily employed on a throwaway basis. Furthermore, this filter is surprisingly effective in the filtration of molten metal, especially aluminum, at a low cost achieving surprising filtration efficiency with considerable flexibility.

The ceramic foam filter preferably utilized in the present invention is prepared from an open cell, flexible foam material having a plurality of interconnected voids surrounded by a web of said flexible foam material, such as polyurethane foams or cellulosic foams. The ceramic foam filter may be prepared in accordance with the general procedure outlined in U.S. Pat. No. 3,893,917 wherein an aqueous ceramic slurry is prepared and the foam material impregnated therewith so that the web thereof is coated therewith and the voids substantially filled therewith. The impregnated material is compressed so that a portion of the slurry is expelled therefrom and the balance uniformly distributed throughout the foam material. The coated foam material is then dried and heated to first burn out the flexible organic form and then sintered the ceramic coating, thereby providing a fused ceramic foam having a plurality of interconnected voids surrounded by a web of bonded or fused ceramic in the configuration of the flexible foam. Naturally, a wide variety of ceramic materials may be chosen depending upon the particularly metal to be filtered. Preferably, a mixture of alumina and chromia is employed; however, these materials may naturally be utilized separately or in combination with other ceramic materials. Other typical ceramic materials which may be employed include zirconia, magnesia, titanium dioxide, silica and mixtures thereof. Normally, the slurry contains from about 10 to 40% of water and one or more rheological agents, binders, or air setting agents.

As shown in FIG. 3A, the filter plate of the present invention 11 has a bevelled peripheral surface 12 adapted to mate with a bevelled surface 10 of the filter chamber. Naturally, variations in design are contemplated within the scope of the present invention, such as shown in FIG. 3B wherein a corresponding flat surface 16 is provided around the entire periphery of filter plate 11 adjacent bevelled surface 12. FIGS. 3A and 3B show filter plates wherein the bevelled surface extends around the entire periphery of the plate; however, it may be more convenient to provide that the bevelled surface extends around less than the entire periphery, as in FIG. 6 wherein the bevelled surface extends around two faces of the plate.

Thus, it can be seen that the filter plate of the present invention may be conveniently utilized in a variety of locations, including pouring pans, pouring troughs, transfer troughs, pouring spouts and metal treatment bays. The filter should not be placed in the immediate vicinity of turbulent molten metal flow, especially where such turbulence results in oxide formation and entrainment. This is true for the case of turbulence both upstream and downstream of the filter. Turbulence upstream of the filter with attendant oxide entrainment tends to lead to channeling of the filter, inefficient filtration and in severe cases premature blockage of the filter. Turbulence downstream of the filter will tend to undo the good rendered by the filter and once again load the molten metal with oxide or other nonmetallics which are present or are formed on the surface of the metal. Frequently encountered sources of turbulence are furnace tap holes, pouring spouts and other devices which cause rapid changes in flow cross section and consequent high velocity gradients. Naturally, the particular filter installation must be chosen with care to ensure that it too does not become another source of turbulence. The foregoing considerations of turbulence are, of course, particularly relevant to chemically reactive metals, such as aluminum and magnesium and their alloys which readily oxidize on contact with air; however, these considerations are also significant for less reactive metals, such as copper and its alloys. Naturally, devices are available in the art to mitigate turbulence, as, for example, appropriately placed vanes.

As can be seen from the foregoing, the filter plate of the present invention may be conveniently disposed substantially horizontally. In addition, if desired, the filter may be disposable substantially vertically or at an intermediate angle with respect to the flow of molten metal. The vertical disposition of the filter plate of the present invention will be described in a specific embodiment hereinbelow. The horizontally disposed filter, however, has two principal advantages over a vertically disposed filter. First, by utilizing the significant length of a pouring trough or length and breadth of a pouring pan a large filter area can be easily and conveniently accommodated. On the other hand, in order to accommodate a large filter area in a vertical installation, one must generally resort to a deep trough, pan or tundish. Such geometric constraints are often of great practical significance, especially where adaptation of existing casting facilities is contemplated. A second advantage of a horizontal filter is the fact that it ensures that all parts of the filter will prime under substantially the same metallostatic head; whereas, a vertical filter will naturally prime under a head varying from top to bottom. For this reason naturally a vertical filter primes in a non-uniform manner. The upper portions of a vertical filter will not pass as much metal as the lower portions thereof and in fact may not prime at all. Furthermore, changes of head upstream of the filter will have more effect on a vertical filter than on a horizontal filter and may result in momentary or significant loss of prime to the upper portions of the filter and even freezing off thereof. To minimize loss of primed area in operation, a filter should remain buried under a minimum head of molten metal. This is easier to achieve with a horizontal filter than with a vertical one. Also, exposure of unprimed areas of a vertical filter above the metal line can result in cracking of the filter due to thermal stress from the high temperature gradients obtaining under such conditions. For the foregoing reasons, a horizontally or substantially horizontally disposed filter is preferred in the present invention.

A disadvantage, however, of horizontally placed filters is that air can be trapped beneath these filters. This in turn can lead to oxide formation downstream of the filter and to channeling of flow through the filter and, hence, less than optimum filtration. This type of entrapment is obviated by a vertical disposition of the filter.

In accordance with the present invention, it has been found that the foregoing disadvantages of horizontally disposed filters can be greatly minimized while retaining essentially all advantages of a horizontally disposed filter by canting the filter at a small angle of from 1° to 5° to the horizontal. Such a disposition allows escape of the air during initial priming of the filter without relinquishing the uniform or substantially uniform depth of immersion of the filter body resulting from horizontal placement. Preferably, as shown in FIG. 2, the high point on the horizontally disposed filter surface should be at the extreme downstream end of the filter so that the escape of air is augmented by the sweeping action of the metal stream. It can be seen that the feature of a substantially horizontally disposed, upwardly sloped filter is highly advantageous so that excellent results may be obtained using said feature without the use of a bevelled peripheral surface, as, for example, using a split filter chamber and holding the filter therein with a vise type action. Naturally, an appropriate sealing means should also be used and also the floor 15 of recess 14 beneath filter plate 11 is preferably sloped as described above.

It should be noted that before priming one must have sufficient volume of metal upstream to avoid depletion of the metal feed to the filter and possible freeze off of portions of the filter.

A wide variety of filter plate configurations can be utilized in the present invention depending upon the particular conditions of use and naturally to allow use with a minimum of modification to existing equipment. Flat plates of any shape are naturally preferred since they are easier to prepare; however, one may conveniently utilize plugs, curved shapes, hollow cylinders or the like. Generally, a single large filter unit is employed capable of handling the total flow of metal being cast or transferred. However, a number of small filters in parallel may also be used. For example, smaller filter units may be designed to fit over individual ingot pouring spouts. In addition, one may conveniently utilize a single filter of varying porosity or separate filters of different porosity as described in the aforesaid copending application SN 563,213 wherein, for example, a larger relative pore size filter is utilized upstream and a smaller relative pore size is utilized downstream so that the upstream filter removes gross inclusions and the downstream filter removes smaller entrained solids.

Continuous casting is another instance where a parallel arrangement of two or more filters may be advantageously employed. In such an operation, the great length and associated great total flow of metal involved may require changing of filters in mid-run. Such changes may be facilitated by the use of parallel flow channels each containing a filtering unit and a means of diverting flow from one to the other by valves or dams. Flow would be restricted to one filter and one filter unit at a time and would be diverted to another channel and a fresh filtering unit once the head drop across the first filter unit became excessive. It can be seen that such a switching procedure could supply an endless stream of filter metal to a continuous casting station. Multistage filters can also be used and may be quite advantageous and even necessary where input metal is of very poor quality in terms of nonmetallic loading. Such multistage units may consist of two or more individual filters in series or may take the form of an array of plates packed firmly or loosely together to form a single filter unit. A single filter of continuously graded properties through its thickness may also be conveniently employed. Naturally, in this case, the filter units, segments or parts thereof should be made progressively finer from initial inlet to final outlet location.

Since the filter plate of the present invention is designed to be a throwaway item, it is essential to provide an effective means of sealing the filter plate in place in its holder which is easy to assemble, disassemble and clean up. The holder or filter chamber itself is normally an integral part of a trough, pouring pan or tundish, etc. and should be constructed of refractory materials resistant to the molten metal similar to those used in standard trough construction. It is greatly preferred to seal the filter plate in place using a resilient sealing means or gasket type seal peripherally circumscribing the filter plate at the bevelled portion thereof. The gasket type seals ensure a leak free installation and also provide an effective parting medium which is essential for ease of disassembly. In addition, since the gaskets or sealing means prevents ingress of metal to the sealing faces of the holder unit, their use considerably eases clean up and effectively prolongs the life of the unit by eliminating problems of metal attack. Furthermore, because of its resiliency, the gasket may provide sufficient frictional force to hold the filter body in place in the holder or filter chamber without resort to other types of hold down devices. The resilient sealing means should be non-wetting to the particular molten metal, resist chemical attack therefrom and be refractory enough to withstand the high operating temperatures.

Plate type filter units of the present invention may be sealed by gaskets around their edges and/or at the peripheries of their large faces. The plate type filter units of the present invention are preferably sealed by an edge type seal along the bevelled peripheral surface of the filter plate thus providing a positive seal and, in conjunction with the gasket, a mechanical advantage to hold the filter in place. In the event that a simple press fit is insufficient to hold the filter in place, naturally a variety of mechanical devices such as wedges and hold down weights may be employed. Alternatively, the refractory sealing unit into which the filter is to be fitted can be made to be split as shown in FIG. 1 so that pressure can be applied to the seals by the vise like action of closing the split unit. The bevelled angle of the filter chamber and corresponding bevelled angle of the filter plate tends to form a positive seal and hold the filter in place against buoyancy forces acting thereupon. Naturally, as indicated above, the gasket or seal should be resistant to the molten metal utilized. Typical seal materials include fibrous refractory type seals of a variety of compositions, as the following illustrative seals: (1) a seal containing about 45% alumina, 52% silica, 1.3% ferric oxide and 1.7% titania; (2) a seal containing about 55% silica, 40.5% alumina, 4% chromia and 0.5% ferric oxide; and (3) a seal containing about 53% silica, 46% alumina and 1% ferric oxide.

Figure 4:
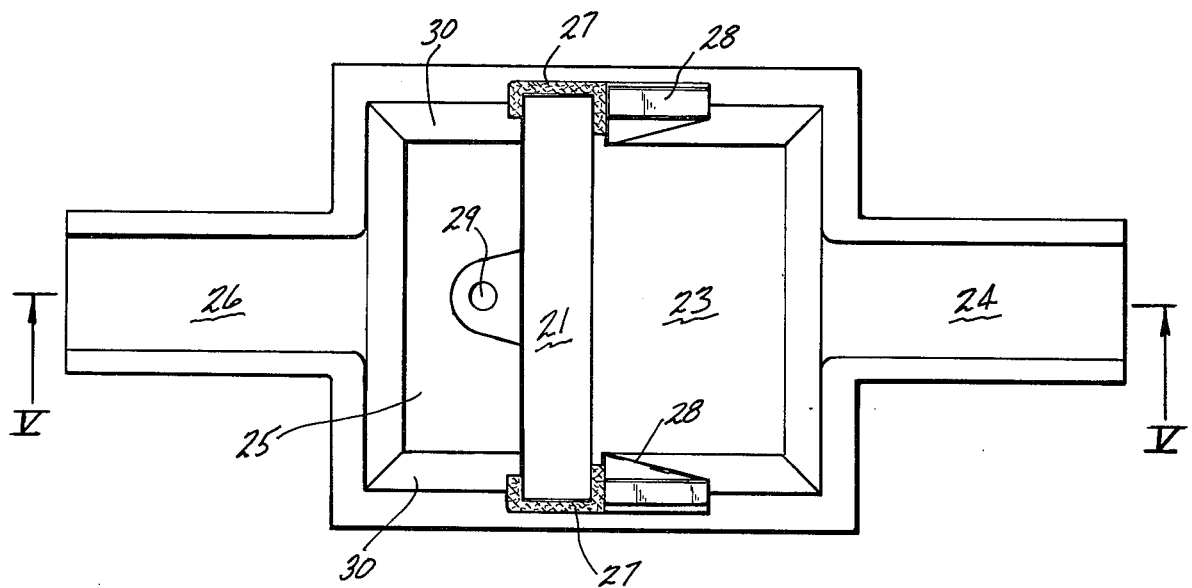
FIG. 4 is a top view of another embodiment of the filter chamber of the present invention wherein the filter plate is substantially vertically disposed.
Figure 5:
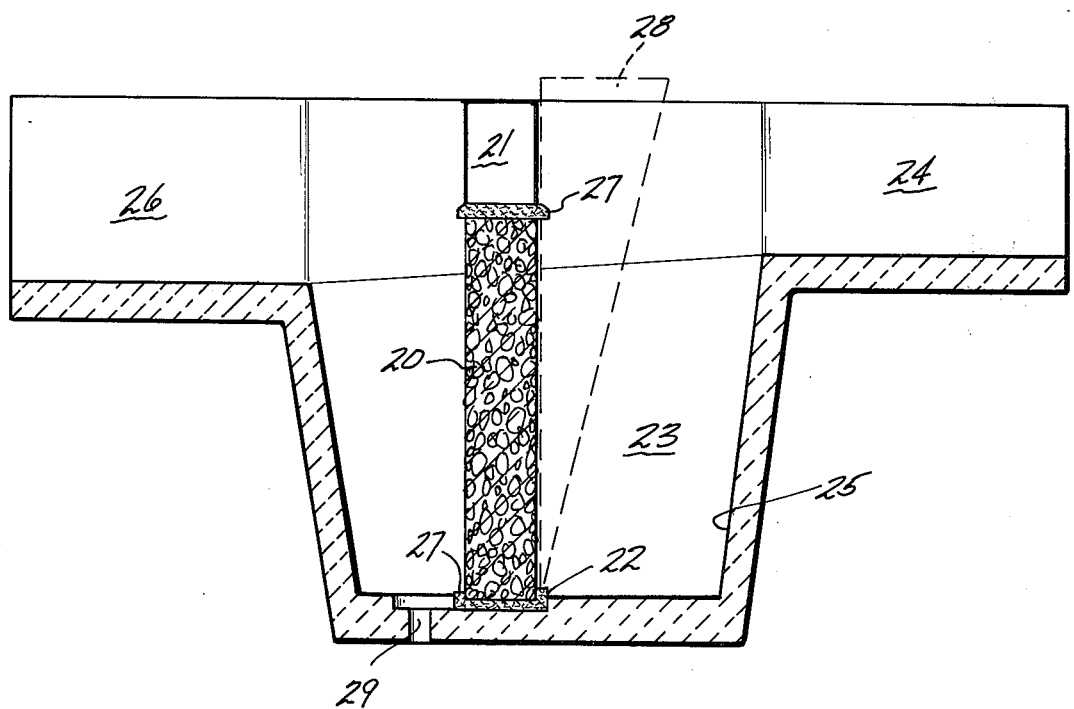
FIG. 5 is a sectional view along the lines V—V of FIG. 4.

FIGS. 4 and 5 show a vertically disposed filter installation in a transfer trough according to the present invention. In the embodiment of FIGS. 4 and 5, a filter plate 20 is held in place by a refractory dam 21 and positioned in a slot 22 in a filter chamber 23. Molten metal is fed to the filter chamber 23 via inlet trough 24 and passes horizontally into filter chamber well 25 and thence through filter plate 20 into outlet trough 26. Filter plate 20 is sealed into slot 22 by means of a ceramic fiber gasket 27 which completely circumscribes the filter plate 20. The pregasketed filter plate 20 and dam 21 are placed into the slot 22 and sealed in place by means of wedges 28. A drain hole 29 is provided to drain well 25 of metal at the completion of pouring or transfer. In operation, the drain hole 29 may be closed by a stopper rod or other convenient closure means, not shown.

The filter plate of the present invention, as filter plate 20, is a frustrum or segment of a solid figure with sloping sides so that the peripheral surface thereof has a bevelled configuration. Filter chamber well 25 has a corresponding bevelled wall surface 30 (FIG. 4) to mate with the bevelled peripheral surface 31 of the filter plate (FIG. 6). Filters up to several inches thick and several square feet in area can be conveniently located in troughs in the foregoing manner. The dam 21 and the filter chamber 23 may be made of conventional materials of construction. The filter well 25 and corresponding trough linings may be conveniently prepared of castable refractory or ceramic tile. The dam 21 and wedges 28 may be made of refractory boards such as Marinite if the metal to be filtered is aluminum or some lower melting alloy. Naturally, the sealing means 27 is preferably adjacent the bevelled filter plate surface 31; however, as shown in FIGS. 4-6 where the filter plate is bevelled on only two (2) peripheral faces thereof, the sealing means is preferably adjacent all peripheral surfaces of the filter plate including non-bevelled peripheral surfaces.

FIG. 7 shows an example of a horizontally disposed frustoconical filter plate installation designed to feed a single feeding pouring spout. In this unit, filter plate 40 is located in a recess 41 in the refractory base 42 of a pouring pan or tundish 43. During casting metal from pan 43 flows vertically through filter plate 40 into channel 44 beneath filter plate 40 and thence into pouring spout 45 feeding an ingot or casting below. The filter plate is provided with a bevelled peripheral surface 46 for mating with a corresponding bevelled surface 47 in recess 41. A resilient sealing means 48 is provided between the corresponding bevelled surfaces so that the presealed filter 40 is positioned and sealed in place by pressure from above in a manner similar to the preceding embodiments. Preferably, some means should be provided for venting air bubbles from the bottom of the filter.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:
1. In the filtration of molten metal with a removable filter plate, the method which comprises:
providing a filter chamber having a metal inlet and a metal outlet and having a bevelled wall surface adapted to be partitioned by a filter plate;
providing a filter plate for filtration of molten metal having an open cell structure characterized by a plurality of interconnected voids, said plate having a bevelled peripheral surface adapted to mate with the bevelled wall surface of the filter chamber and including a resilient sealing means on said bevelled filter plate surface resistant to said molten metal, wherein said filter plate is a ceramic foam filter plate having an open cell structure characterized by a plurality of interconnected voids surrounded by a web of said ceramic;
inserting said filter plate and sealing means in said filter chamber to engage the bevelled wall surface of the filter chamber; and
thereafter passing molten metal through said filter plate for discharge through said outlet, wherein the surface of the filter plate is maintained below the level of the molten metal.

2. The method of claim 1 wherein said molten metal is aluminum or its alloys.

3. The method of claim 1 wherein said filter has an air permeability in the range of 400 to 8,000 $\times$ 10$^{-7}$ cm$^2$, a porosity of 0.80 to 0.95, a pore size of 5 to 45 pores per linear inch and a thickness of ½ to 4 inches.

4. The method of claim 1 wherein the bevelled filter chamber wall surface and the bevelled peripheral surface of the filter plate are bevelled at an angle from 2° to 20°.

5. The method of claim 4 wherein the bevelled peripheral surface of the filter plate has substantially the same angle as the bevelled filter chamber wall surface.

6. The method of claim 1 wherein said filter plate is substantially horizontally disposed at an angle of from 1° to 5° upwardly sloped towards said metal outlet.

7. The method of claim 6 wherein the floor of the filter chamber beneath the filter plate is sloped downwardly towards said metal outlet.

8. The method of claim 1 wherein said sealing means is a ceramic gasket.

9. The method of claim 1 wherein said filter plate is substantially vertically disposed in a trough in the floor of the filter chamber.

10. The method of claim 1 wherein said filter is substantially horizontally disposed above a pouring spout.

11. The method of claim 1 wherein said filter plate has a flat surface around the entire periphery thereof adjacent the bevelled filter plate surface.

12. The method of claim 1 wherein said resilient sealing means peripherally circumscribes the filter plate at the bevelled portion thereof.

13. An improved filtration apparatus comprising: a filter chamber having a metal inlet and metal outlet and having a bevelled wall surface adapted to be partitioned by a filter plate; a ceramic foam filter plate for the filtration of molten metal having an open cell structure characterized by a plurality of interconnected voids surrounded by a web of said ceramic, said plate having a bevelled peripheral surface mating with the bevelled wall surface of the filter chamber; and a resilient sealing means between and engaging said mating surfaces resistant to said molten metal, wherein the filter plate partitions the filter chamber so as to be readily insertable therein and removable therefrom.

14. An apparatus according to claim 13 wherein said filter has an air permeability in the range of 400 to 8,000 × $10^{-7}$ cm$^2$, a porosity of 0.80 to 0.95, a pore size of 5 to 45 pores per linear inch and a thickness from ½ to 4 inches.

15. An apparatus according to claim 13 wherein the bevelled filter chamber wall surface and the bevelled peripheral surface of the filter plate are bevelled at an angle from 2° to 20°.

16. An apparatus according to claim 15 wherein the bevelled peripheral surface of the filter plate has substantially the same angle as the bevelled filter chamber wall surface.

17. An apparatus according to claim 13 wherein said filter plate is substantially horizontally disposed at an angle of from 1° to 5° upwardly sloped towards said metal outlet.

18. An apparatus according to claim 17 wherein the floor of the filter chamber beneath the filter plate is sloped downwardly towards said metal outlet.

19. An apparatus according to claim 13 wherein said sealing means is a ceramic gasket.

20. An apparatus according to claim 13 wherein said filter plate is substantially vertically disposed in a trough in the floor of the filter chamber.

21. An apparatus according to claim 13 wherein the filter is substantially horizontally disposed in a pouring spout.

22. An apparatus according to claim 13 wherein said filter plate has a flat surface around the entire periphery thereof adjacent the bevelled filter plate surface.

23. An apparatus according to claim 13 wherein the resilient sealing means peripherally circumscribes the filter plate at the bevelled portion thereof.

* * * * *

UNITED STATES PATENT OFFICE
CERTIFICATE OF CORRECTION

PATENT NO. : 4,024,056
DATED : May 17, 1977
INVENTOR(S) : John C. Yarwood, James E. Dore & Robert K. Preuss It is certified that error appears in the above-identified patent and that said Letters Patent are hereby corrected as shown below:

Column 5, line 46, the word "form" should read ---foam---;

Column 5, line 52, the word "particularly" should read ---particular---.

Column 8, line 36, the word "prevents" should read ---prevent---.

Column 10, line 32, the word "of" should read ---from---.

Column 12, line 11, the word "the" should read ---said---;

Column 12, line 17, the word "the" should read ---said---.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks